(12) United States Patent
Srinivas et al.

(10) Patent No.: US 9,112,345 B2
(45) Date of Patent: Aug. 18, 2015

(54) IN-RUSH CURRENT LIMITER AND METHOD FOR STOWABLE AND CARRY-ON DEVICES

(71) Applicant: HONEYWELL INTERNATIONAL INC., Morristown, NJ (US)

(72) Inventors: Ashvin Srinivas, Karnataka (IN); Kenneth Fair, Bradenton, FL (US); Stephen Mead, Bradenton, FL (US); Animesh Mukherjee, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 149 days.

(21) Appl. No.: 13/900,972

(22) Filed: May 23, 2013

(65) Prior Publication Data
US 2013/0329330 A1    Dec. 12, 2013

Related U.S. Application Data (60) Provisional application No. 61/656,072, filed on Jun. 6, 2012.

(51) Int. Cl.
*H02H 9/08*    (2006.01)
*H02H 9/00*    (2006.01)
*H02H 3/093*    (2006.01)

(52) U.S. Cl.
CPC ............... *H02H 9/002* (2013.01); *H02H 3/093* (2013.01); *H02H 9/001* (2013.01)

(58) Field of Classification Search
CPC .................................. H02H 9/00; H02H 9/002
See application file for complete search history.

(56) References Cited

U.S. PATENT DOCUMENTS

| | | | |
|---|---|---|---|
| 4,268,884 | A | 5/1981 | Ford, Jr. et al. |
| 4,686,518 | A | 8/1987 | Schweitzer, Jr. |
| 5,572,395 | A | 11/1996 | Rasums et al. |
| 5,587,685 | A | 12/1996 | Johansson |
| 5,784,576 | A | 7/1998 | Guthrie et al. |
| 6,049,143 | A | 4/2000 | Simpson et al. |
| 7,184,253 | B1 | 2/2007 | Hartranft et al. |
| 7,324,316 | B2 | 1/2008 | Chen et al. |
| 7,339,772 | B2 | 3/2008 | Ochi |
| 7,511,388 | B2 | 3/2009 | Webb et al. |
| 7,511,930 | B2 | 3/2009 | Apfel |
| 7,516,340 | B2 | 4/2009 | Landry et al. |
| 7,548,799 | B2 | 6/2009 | Landry et al. |

(Continued)

OTHER PUBLICATIONS

IXYS Corporation, "Negative Voltage Hot Swap Controller with Active Power Filter", Aug. 2000, IXYS Corporation.*

*Primary Examiner* — Thienvu Tran
*Assistant Examiner* — Tien Mai
(74) *Attorney, Agent, or Firm* — Ingrassia Fisher & Lorenz, P.C.

(57) ABSTRACT

A system and method for limiting in-rush current from a power source to a load includes sensing that a load has been electrically connected to receive electrical power from the power source. A current limiter circuit is configured to at least inhibit electrical current flow from the power source to the load for a predetermined time period. After the predetermined time period, the current limiter circuit is configured to no longer at least inhibit the electrical current flow from the power source to the load. Upon sensing that the load has been electrically disconnected from the power source, the current limiter circuit is reconfigured to at least inhibit electrical current flow from the power source to a load that may be subsequently connected to receive electrical power from the power source.

12 Claims, 7 Drawing Sheets

(56) References Cited

U.S. PATENT DOCUMENTS 7,609,494 B2 10/2009 Webb
7,715,165 B2 5/2010 Gammel et al.
7,855,866 B2 12/2010 Crawley et al.
7,979,168 B2 7/2011 Velez et al.
8,319,539 B2 * 11/2012 Afaneh .......................... 327/318

* cited by examiner

FIG. 3C

IN-RUSH CURRENT LIMITER AND METHOD FOR STOWABLE AND CARRY-ON DEVICES

CROSS-REFERENCE TO RELATED APPLICATION

This application claims the benefit of U.S. Provisional Application No. 61/656,072, filed Jun. 6, 2012.

TECHNICAL FIELD

The present invention generally relates to electrical protection for devices, and more particularly relates to an inrush current limiter for stowable and carry-on devices.

BACKGROUND

Cabin Management Systems power various cabin products. Many systems include a monitor/protection device that monitors the electrical bus supplying electrical power to the stowable products to determine if an overcurrent or overpower condition persists for a set period of time. If an overcurrent or overpower condition does persist for the set period of time, then the monitor/protection device will trip, and thereby remove the electrical power to that particular cabin product. After a maintenance action occurs to correct the fault in that particular cabin product the monitor/protection may be reset via, for example, software.

Many cabin products, such as monitors or various portable electronic devices, may have to be stowed during aircraft taxi, takeoff, and landing maneuvers. During an aircraft flight phase, however, such devices may be energized from the vehicle power distribution system via a connector. In some aircraft, there have been instances, under specific conditions, in which a contact bounce occurs at the connector. Such a contact bounce can cause multiple instances of in-rush currents, effectively lengthening the duration of the in-rush beyond worst case tolerances. In such instances, the monitor/protection device trips, requiring maintenance personnel to reset the device. Such random events can be difficult to detect and prevent. When these events occur in-flight, it results in downtime of the device until resolution by maintenance personnel.

Hence, there is a need for a system and method of limiting in-rush current to powered devices that may be connected and disconnected from an aircraft power source during aircraft maneuvers. The present invention addresses at least this need.

BRIEF SUMMARY

In one embodiment, an in-rush current limiter circuit a power switch, a load insertion detector, and a switch control. The power switch is adapted to couple to an electric power source. The power switch is coupled to receive switch control signals and is configured, in response thereto, to selectively transition between an OFF state, in which electric current will not flow through the power switch, and an ON state, in which electric current will flow through the power switch. The load insertion detector is configured to sense when a load is electrically coupled to the electric power source and, upon detecting that the load is electrically coupled to the electric power source, to supply an insertion signal. The switch control is coupled to receive the insertion signal and is configured, in response thereto, to supply a switch control signal for a predetermined time period that causes the power switch to transition to, or remain in, the OFF state for the predetermined time period, and after the predetermined time period, supply a switch control signal that causes the power switch to transition to the ON state.

In another embodiment, an in-rush current limiter circuit includes a power switch, a load insertion detector, a load removal detector, and a switch control. The power switch is adapted to couple to an electric power source. The power switch is coupled to receive switch control signals and is configured, in response thereto, to selectively transition between an OFF state, in which electric current may not flow through the power switch, and an ON state, in which electric current may flow through the power switch. The load insertion detector is configured to sense when a load is electrically coupled to the electric power source and, upon detecting that the load is electrically coupled to the electric power source, to supply an insertion signal. The load removal detector is configured to sense when the load is electrically decoupled from the electric power source and, upon detecting that the load is electrically decoupled, to supply a removal signal. The switch control is coupled to receive the insertion signal and the removal signal. The switch control is configured to supply a first switch control signal for a predetermined time period upon receipt of the insertion signal that causes the power switch to transition to, or remain in, the OFF state for the predetermined time period. The switch control is also configured, after the predetermined time period, to supply a switch control signal that causes the power switch to transition to the ON state. The switch control is also configured to supply a switch control signal that causes the power switch to transition to the OFF state upon receipt of the removal signal.

In yet another embodiment, a method for limiting in-rush current from a power source to a load includes sensing that a load has been electrically connected to receive electrical power from the power source. A current limiter circuit is configured to at least inhibit electrical current flow from the power source to the load for a predetermined time period. After the predetermined time period, the current limiter circuit is configured to no longer at least inhibit the electrical current flow from the power source to the load. Upon sensing that the load has been electrically disconnected from the power source, the current limiter circuit is reconfigured to at least inhibit electrical current flow from the power source to a load that may be subsequently connected to receive electrical power from the power source.

Furthermore, other desirable features and characteristics of the current limiter and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
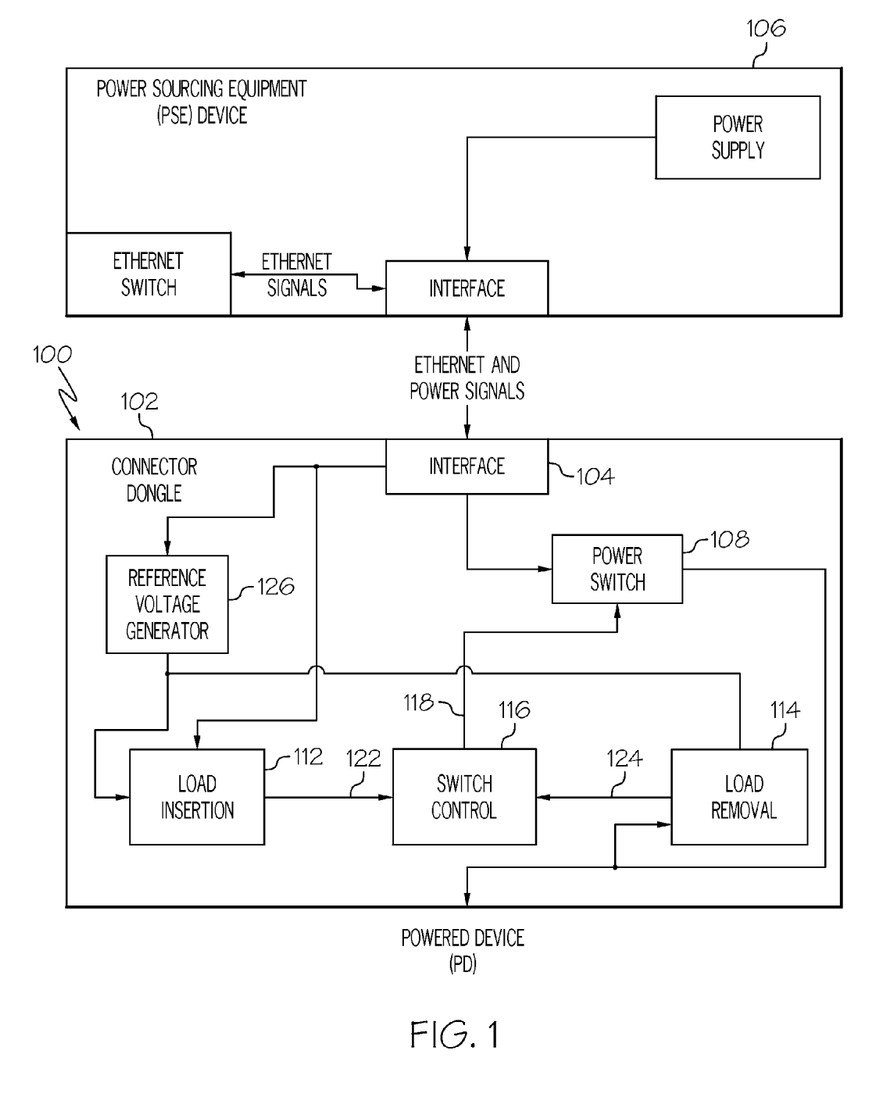
FIG. 1 depicts a functional block diagram of one embodiment of an in-rush current limiter coupled in between an electric power source and a powered device.

Referring first to FIG. 1, a functional block diagram of an in-rush current limiter 100 is depicted. The in-rush current limiter 100 is configured to limit the current flow from an aircraft power source when a stowable or carry-on device is connected to the power source. The in-rush current limiter 100 is preferably disposed within a housing 102, such as a connector dongle, that includes a connector interface 104 that is connectable to the power source 106. In the depicted embodiment, the power source 106 is configured as a Power over Ethernet (PoE) device that is configured to supply both electrical power and data to the connector interface 104.

No matter the specific configuration of the power source 106, the in-rush current limiter 100 includes a power switch 108, a load insertion detector 112, a load removal detector 114, and a switch control 116. The power switch 108 is adapted to couple, via the connector interface 104, to the electric power source 106. The power switch 108 is also coupled to receive switch control signals 118 and is configured, in response thereto, to selectively transition between an OFF state and an ON state. In the OFF state electric current will not flow through the power switch 108, but in the ON state electric current will flow through the power switch 108. As will be described further below, the switch control signals 118 are supplied to the power switch 108 from the switch control 116.

The load insertion detector 112 is configured to sense when a load is electrically coupled to the power source 106, and the load removal detector 114 is configured to sense when the load is electrically decoupled from the power source 106. The load insertion detector 112 is additionally configured, upon detecting that the load is electrically coupled to the power source 106, to supply an insertion signal 122 to the switch control 116. Moreover, the load removal detector 114 is further configured, upon detecting that the load is electrically decoupled from the power source 106, to supply a removal signal 124 to the switch control 116.

The switch control 116 is coupled to receive the insertion signal 122 and the removal signal 124 that are selectively supplied by the load insertion detector 112 and the load removal detector 114, respectively. The switch control 116 is configured, in response to these signals 122, 124, to supply appropriate switch control signals 118 to the power switch 108 to appropriately control the state of the power switch 108. In particular, the switch control 116, in response to the insertion signal 122, supplies a switch control signal 118 that causes the power switch 108 to transition to (or remain in) the OFF state for a predetermined time period and then, after the predetermined time period, supplies a switch control signal 118 that causes the power switch 108 to transition to the ON state. Conversely, the switch control 116, in response to the removal signal 124, supplies a switch control signal 118 that causes the power switch 108 to immediately transition to the OFF state. The predetermined time period may vary, and may be selected to meet desired performance and operational characteristics. In one particular embodiment, the predetermined time period is 100 milliseconds.

As FIG. 1 additionally depicts, the in-rush current limiter 100 further includes a reference voltage generator 126. The reference voltage generator 126 receives electrical power from the power source 106 and supplies a regulated voltage to both the load insertion detector 112 and the load removal detector 114.

Figure 2:
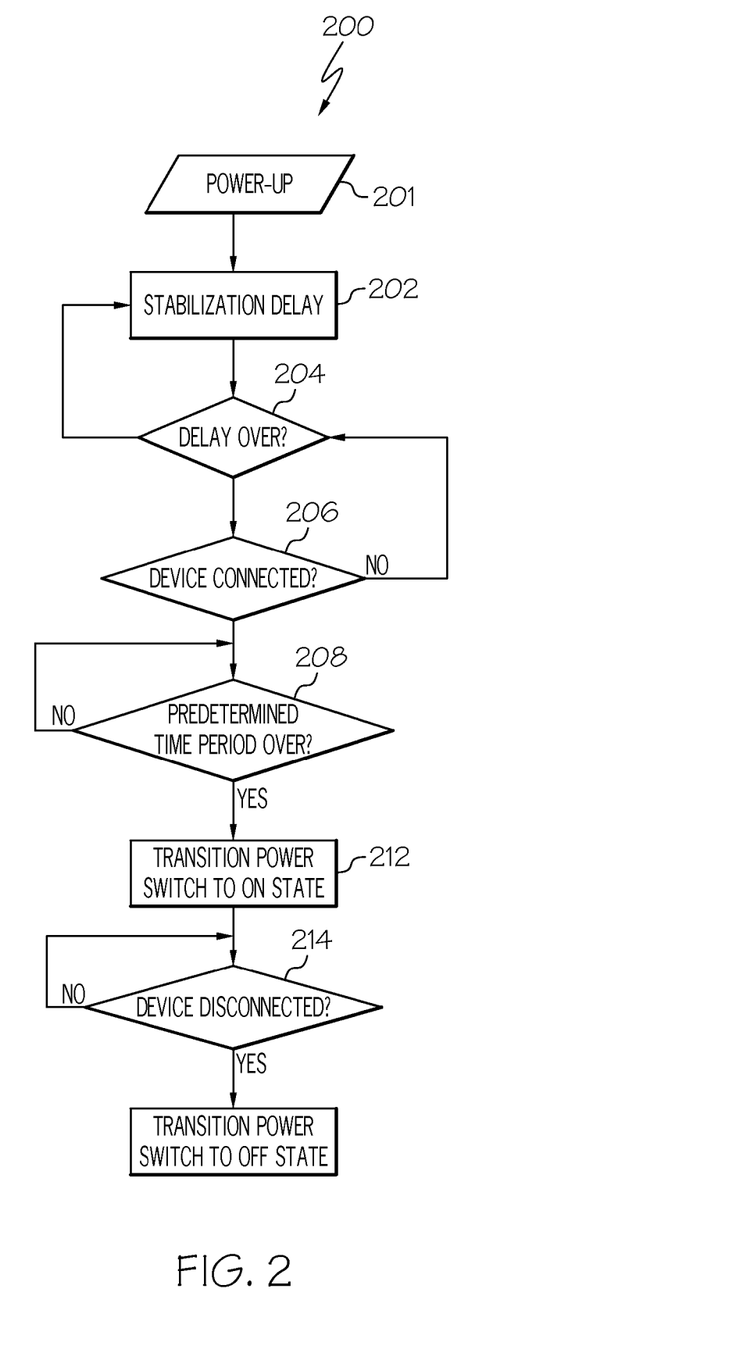
FIG. 2 depicts a process, in flowchart form, that the current limiter of FIG. 1 may implement to limit in-rush current to a powered device.

The in-rush current limiter 100 depicted in FIG. 1 implements a process 200, which is depicted in flowchart form in FIG. 2, to limit the in-rush current to a non-illustrated powered device that may be electrically connected to the power source 106 via the in-rush current limiter 100. In particular, the in-rush current limiter 100, upon detecting that a powered device is connected to the power switch 108, prevents, or at least significantly inhibits, current flow from the power source 106 to the powered device for the predetermined time period. After the predetermined time period, current may flow, uninhibited by the in-rush current limiter 100, to the powered device. The depicted process 200 will now be described.

The process 200 begins on power-up (201) of the in-rush current limiter 100. After a short initial stabilization delay (202, 204), the in-rush current limiter 100, via the load insertion detector 112, determines if a powered device has been connected (206). If not, then the in-rush current limiter 100 continues making this determination. However, if a powered device has been connected, the in-rush current limiter 100 initiates a time delay that lasts for the predetermined time period (208). During this predetermined time period, current flow from the power source 106 to the powered device is at least inhibited. As soon as the predetermined time period is over, the power switch 108 is transitioned to the ON state, and thus the in-rush current limiter 100 allows current to flow, uninhibited, to the powered device (212).

Thereafter, the in-rush current limiter 100, via the load removal detector 114, determines if the powered device has been disconnected (214). If not, then the in-rush current limiter 100 continues to allow current to flow uninhibited to the powered device. If, however, the in-rush current limiter 100 determines that the powered device is disconnected, it immediately transitions the power switch to the OFF state, and thereby reconfiguring the in-rush current limiter 100 to at least inhibit electrical current flow from the power source 106 to a powered device that may be subsequently connected to receive electrical power from the power source (216).

The in-rush current limiter 100 may be implemented using any one of numerous circuit configurations to carry out its functions. One particular circuit configuration is depicted in FIG. 3, and with reference thereto will now be described.

In the depicted embodiment, the power switch 108 comprises a solid-state relay circuit. In particular, the power switch 108 comprises an opto-isolated solid-state relay that includes a light emitting diode (LED) 302 and a photo-sensitive MOSFET 302. As is generally known, when current is not flowing through the LED 302, the MOSFET 304 is non-conductive and in a high-resistance state. Thus, when current is not flowing through the LED 302 the power switch 108 is in the OFF state. Conversely, when current is flowing through the LED 302, the MOSFET 304 is conductive and in a low-resistance state. Thus, when current is flowing through the LED 302 the power switch 108 is in the ON state. Current flow through the LED 302 is controlled via another transistor circuit 306. As will be described further below, the conduction state of this transistor circuit 306 is controlled via the switch control 116.

Figure 3A:
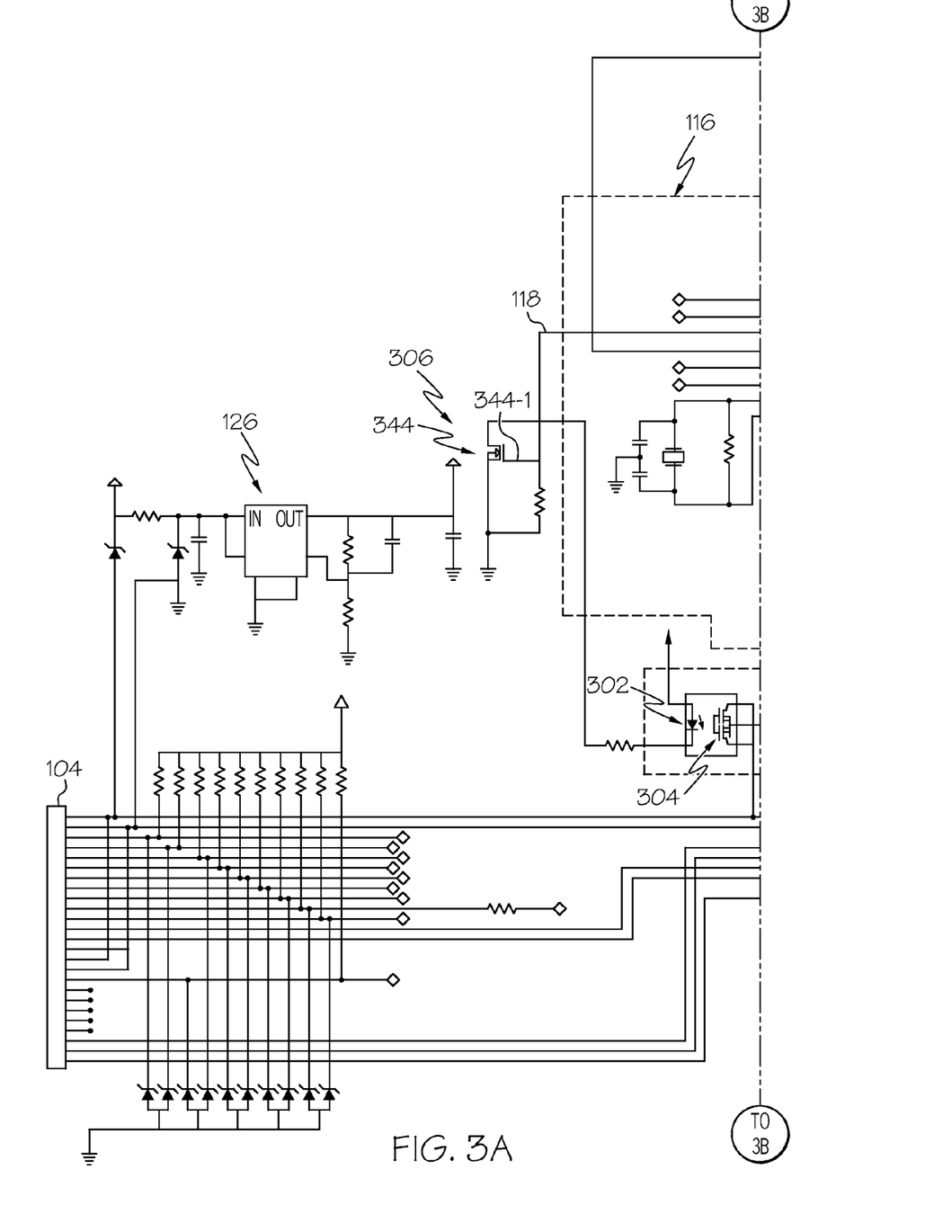
FIGS. 3A-3C depict a schematic diagram of one embodiment of a circuit configuration that may be used to implement the current limiter of FIG. 1.
Figure 3B:
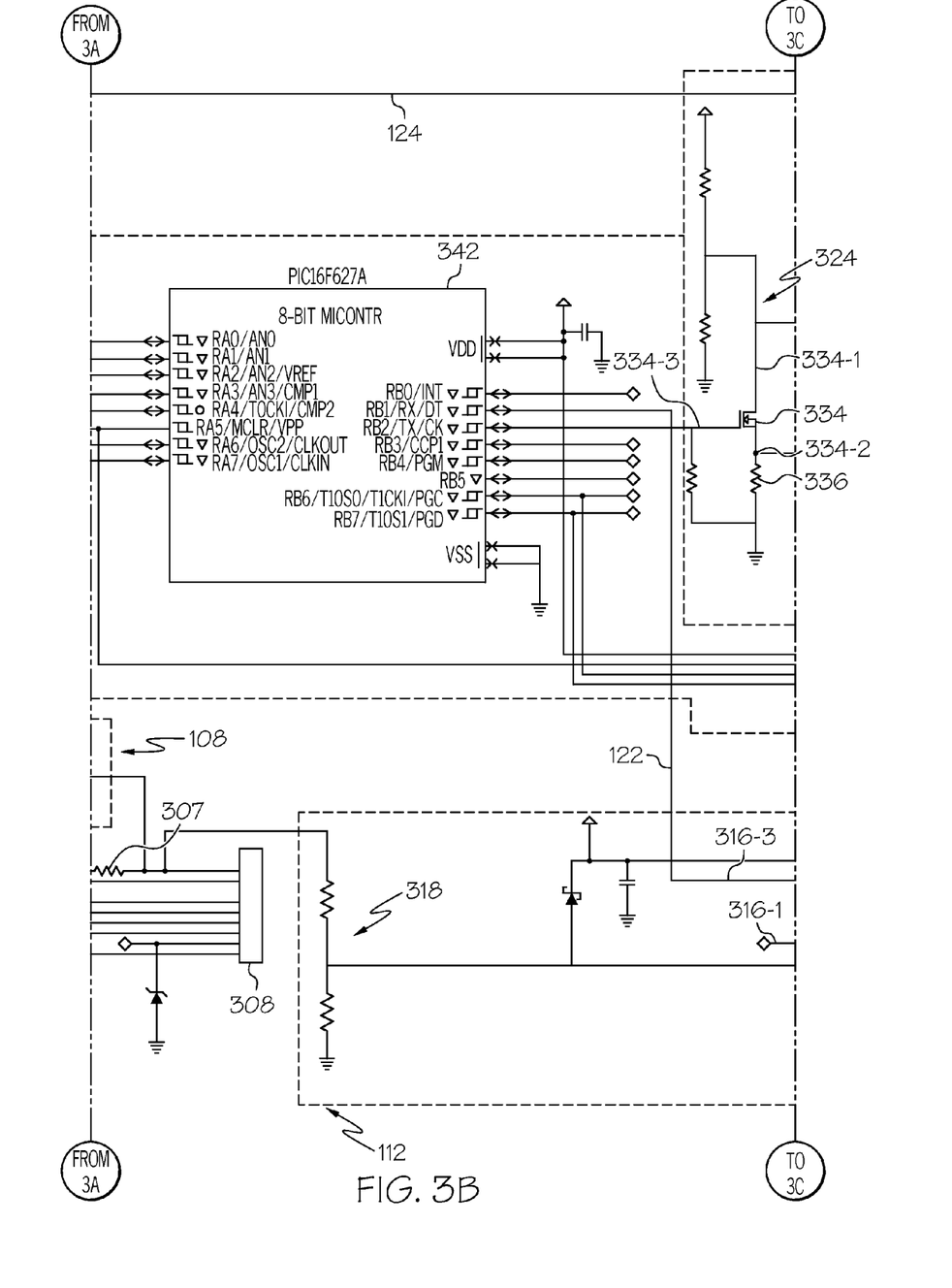
Figure 3C:
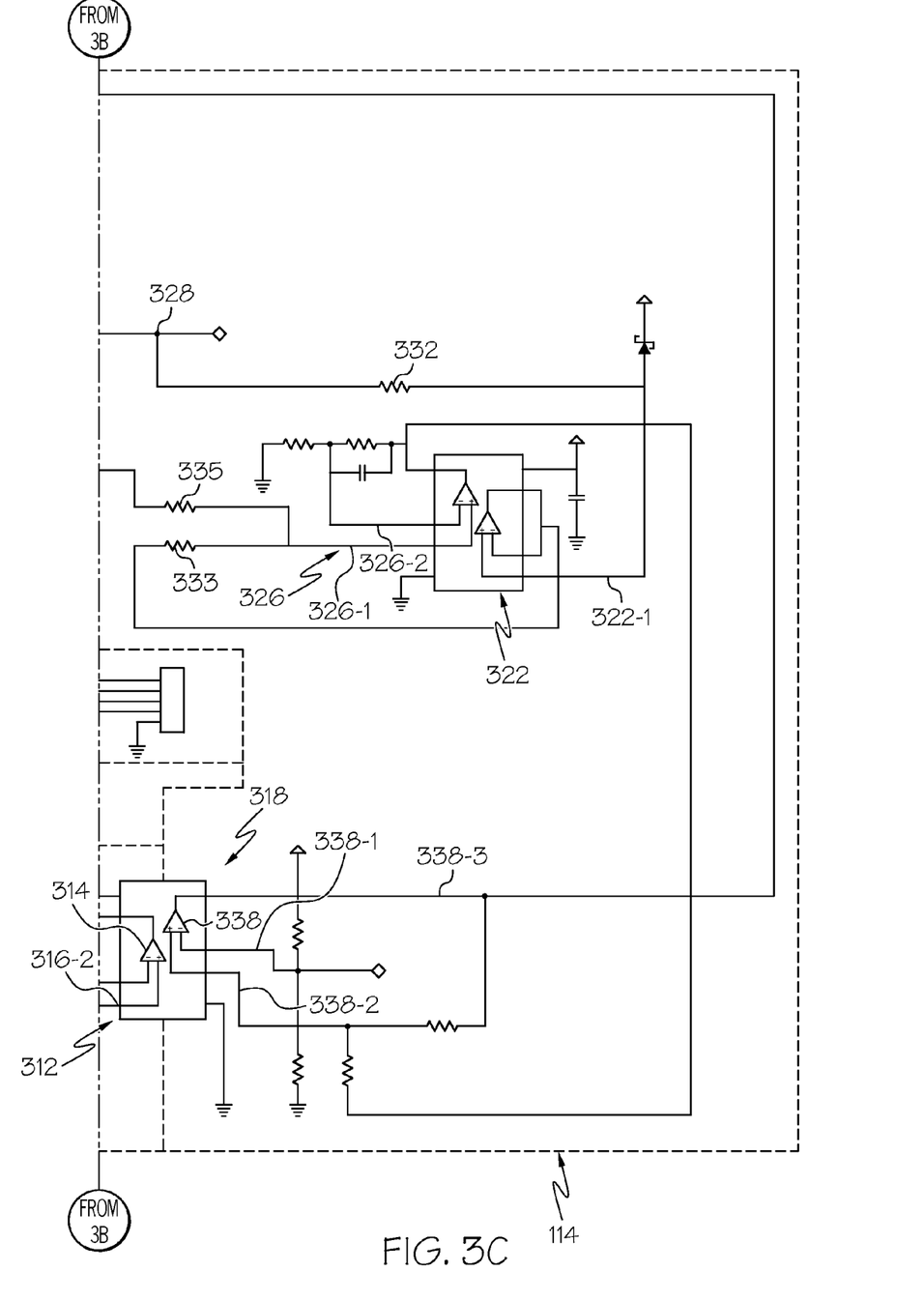

As FIG. 3 also depicts, the power switch 108 is electrically connected in parallel with an input resistor 307. This input resistor 307 is connected in series between one pin of the connector interface 106 and another pin of a second interface 308. This second interface 308 is used to electrically connect a powered device to the power switch 108. The pin of the connector interface 104 to which the input resistor 307 is connected is the one that supplies the electrical power from the power source 106 to the powered device. Thus, as may be readily appreciated, when the power switch 108 is in the OFF state, any current flow from the power source 106 must flow through the input resistor 307. Conversely, when the power switch 108 is in the ON state, the power switch 108 electrically shorts the input resistor 307, and current does not flow through the input resistor 307. The resistance value of the input resistor 307 is relatively high (e.g., 100 k-ohms), so that current flow to the powered device is very limited when the power switch 108 is in the OFF state.

The load insertion detector 112 is implemented using a first comparator circuit 312. The first comparator circuit 312 includes an operational amplifier 314 that is configured as a comparator. The inverting input 316-1 of the amplifier 314 is coupled to a reference voltage, and the non-inverting input 316-2 is coupled to a voltage divider network 318 that is connected between the input resistor 307 and the second connector 308. The operational amplifier 314, as is generally known, is configured to supply, via its output 316-3, a binary voltage, which is the insertion signal 122. That is, the insertion signal 122 is either relatively HIGH or relatively LOW. With the depicted configuration, and as will now be explained, the insertion signal 122 is always HIGH when a powered device is not connected to the second connector 308. The insertion signal 122 transitions to LOW when a powered device is initially connected and then transitions back to HIGH.

When a powered device is not connected to the second connector 308, the power switch 108 is in the OFF state, and thus current flows through the input resistor 307 and the voltage divider network 318. As a result, the voltage at the non-inverting input 316-2 is higher than the reference voltage at the inverting input 316-1, and the insertion signal 122 is HIGH. However, when a powered device is initially connected to the second connector 308, the current that is initially drawn by the powered device will cause the voltage at the non-inverting input 316-2 to decrease below the reference voltage at the inverting input 316-1, and the insertion signal will go LOW. As will be explained further below, the switch control 116, in response to the insertion signal 122 transitioning from HIGH to LOW, supplies the switch control signal 118 that causes the power switch 108 to transition to the ON state. As noted above, when the power switch 108 is in the ON state, it shorts the input resistor 307. Thus, as may be appreciated, shortly after this occurs the voltage at the non-inverting input 316-2 is again higher than the reference voltage at the inverting input 316-1, and the insertion signal 122 transitions back to HIGH.

The load removal detector 114 is implemented using a second comparator circuit 318. In addition to the second comparator circuit 318, the load removal detector 114 further includes a voltage follower 322, a switching transistor circuit 324, and a low-pass filter circuit 326. The voltage follower 322 has in input 322-1 that is coupled to a node 328 via a resistor 332. This node 328 receives a voltage from the powered device when the powered device is connected to the second connector 308. The voltage follower 322 buffers this voltage, and supplies it, via a first input resistor 333 to the non-inverting input 326-1 of the low-pass filter 326.

The switching transistor circuit 324 is implemented using a MOSFET 334 that includes a drain terminal 334-1, a source terminal 334-2, and a gate terminal 334-3. The drain terminal 334-1 is connected to the node 328. The source terminal 334-2 is connected, via a second input resistor 335, to the non-inverting input 326-1 of the low-pass filter 326, and is also connected to a source resistor 336. The gate terminal 334-3 is connected to a pin on the switch control 116 that periodically supplies a signal to the gate terminal 334-3 that causes the MOSFET 334 to switch between conducting and non-conducting states.

The low-pass filter circuit 326, as already noted, has its non-inverting input coupled to receive voltages that may be present at the output of the voltage follower 322 and at the source terminal 334-2. The low-pass filter circuit 326 amplifies and filters the voltage at its non-inverting input 326-1, and supplies this voltage to the second comparator circuit 318.

The second comparator circuit 318, similar to the first comparator circuit 312, includes an operational amplifier 338 that is configured as a comparator. The inverting input 338-1 of the amplifier is coupled to a reference voltage, and the non-inverting input 338-2 is coupled to the output 326-2 of the low-pass filter 326. The operational amplifier 338 is configured to supply, via its output 338-3, a binary voltage, which is the removal signal 124. That is, the removal signal 124 is either relatively HIGH or relatively LOW. With the depicted configuration, and as will now be explained, the removal signal 124 is always LOW when a powered device is not connected to the second connector 308. The removal signal 124 transitions to HIGH when a powered device is connected to the second connector 308. The removal signal 124 will remain HIGH until the powered device is disconnected from the second connector 308.

Initially, before a powered device is connected to the second connector, there is no voltage at node 328, and the MOSFET 334 is not periodically switched between conducting and non-conducting states. Thus, the voltage at the output 326-2 of the low-pass filter 326 is LOW, and so is the removal signal 124. When a powered device is connected to the second connector 308, the MOSFET 334 is periodically switched between conducting and non-conducting states. Moreover, because the powered device supplies a voltage to node 328, the voltage at the source terminal 334-3, which is developed across source resistor 336, is amplified and filtered by low-pass filter circuit 326. This voltage, which is supplied to the non-inverting input 338-2 of operational amplifier 338, is greater than the reference voltage at the inverting input 338-1, so the removal signal 124 goes HIGH. Thereafter, if the powered device is disconnected from the second connector 308, the removal signal 124 immediately transitions to LOW and, as will be described momentarily, the switch control 116, in response to the removal signal 124 transitioning from HIGH to LOW, supplies the switch control signal 118 that causes the power switch 108 to transition to the OFF state.

Figure 4:
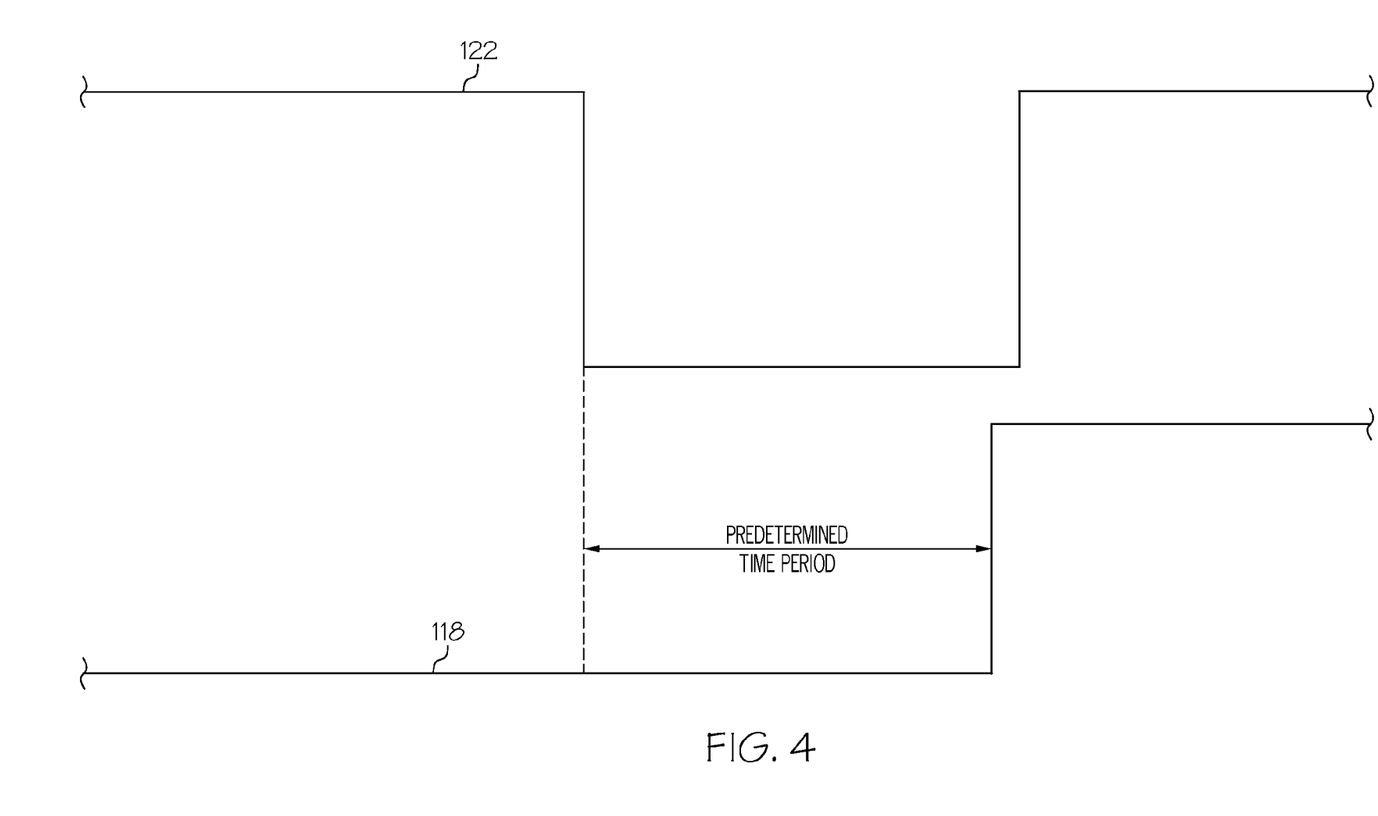
FIGS. 4 and 5 depict various voltage signals at particular points in the current limiter circuit depicted in FIG. 3.

The switch control 116 is implemented using a programmable microcontroller 342. The particular programmable microcontroller 342 that is used (PIC16F627A) is just one example of the limitless number of programmable microcontrollers that could be used to implement the functionality described herein. Moreover, various other circuit components could be configured to implement the functionality of the switch control 116. No matter is specific implementation, and as depicted in FIG. 4, the programmable controller 342, in response to the insertion signal 122 transitioning from HIGH to LOW, initiates an internal timer. After a predetermined period of time has elapsed since the internal timer was initiated, the programmable controller 342 supplies the switch control signal 118 that causes the power switch 108 to transition to the ON state.

In particular, and with reference once again to FIG. 3, the RA2 output port of the programmable microcontroller 342 is connected to the previously mentioned transistor circuit 306. The transistor circuit 306 includes a second MOSFET 344 that has its gate terminal 344-1 connected to the RA2 output port. The second MOSFET 344, in response to the signal output at the RA2 output port, transitions between a conducting and a non-conducting state. In the non-conducting state, no current flows through the second MOSFET 344, and thus does not flow through the LED 302, which means the power switch 108 is in the OFF state. Conversely, when it is in the conducting state, current does flow through the second MOSFET 344, and thus through the LED 302, which means the power switch 108 is in the ON state.

Figure 5:
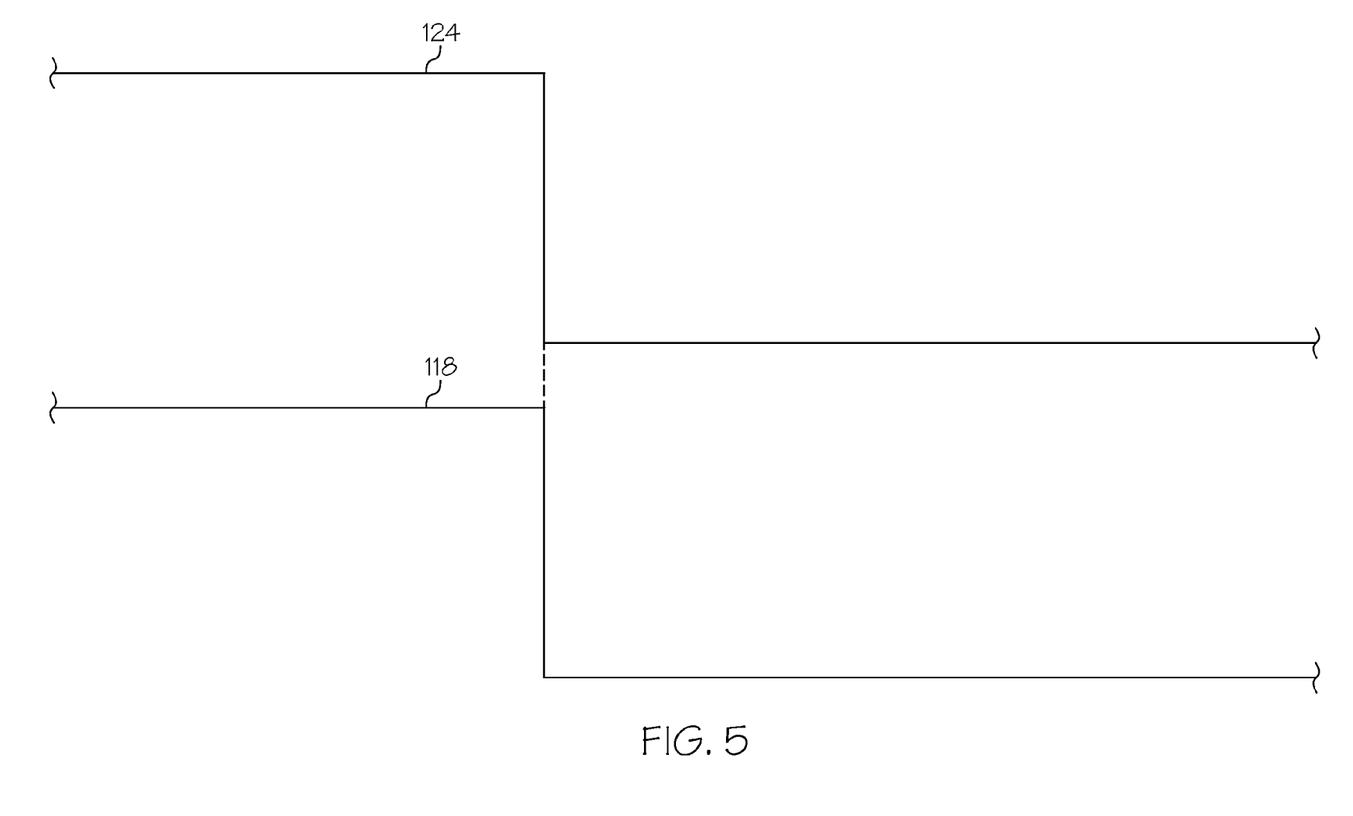

In addition to the above, when the powered device is connected to the second connector 308, the programmable microcontroller 342 will begin supplying a signal to the gate terminal 334-3 of MOSFET 334 that causes the MOSFET 334 to switch between conducting and non-conducting states. As noted above, this results in the removal signal 124 going HIGH, and remaining HIGH until the powered device is disconnected from the second connector 308. As FIG. 5 depicts, when the powered device is disconnected, the removal signal 124 transitions from HIGH to LOW, and the signal output at the RA2 output port of the programmable microcontroller 342 immediately transitions to a level (e.g., LOW) that causes the second MOSFET 344 to transition to the non-conducting state. Thus, the power switch 108 transitions back to the OFF state.

The system and method described herein limit the in-rush current to a powered device that may be connected and disconnected from an aircraft power source during aircraft maneuvers.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An in-rush current limiter circuit, comprising:
a power switch adapted to couple to an electric power source, the power switch coupled to receive switch control signals and configured, in response thereto, to selectively transition between (i) an OFF state, in which electric current will not flow through the power switch, and (ii) an ON state, in which electric current will flow through the power switch;
a load insertion detector configured to supply an insertion signal and to sense when a load is electrically coupled to the electric power source, the load insertion detector configured, upon detecting that the load is electrically coupled to the electric power source, to transition the insertion signal from a HIGH state to a LOW state and then back to the HIGH state; a load removal detector distinct from the load insertion detector and configured to supply a removal signal and to sense when the load is electrically decoupled from the electric power source, the load removal detector configured, upon detecting that the load is electrically decoupled, to transition the removal signal from a HIGH state to a LOW state; and
a switch control coupled to receive the insertion signal and configured, in response to the insertion signal transitioning from the HIGH state to the LOW state, to:
  (i) supply a switch control signal for a predetermined time period that causes the power switch to transition to, or remain in, the OFF state for the predetermined time period, and
  (ii) after the predetermined time period, supply a switch control signal that causes the power switch to transition to the ON state, wherein the switch control is further coupled to receive the removal signal and is further configured, in response thereto to the removal signal transitioning from the HIGH state to the LOW state, to supply a switch control signal that causes the power switch to transition to the OFF state.

2. The circuit of claim 1, wherein the load insertion detector and the load removal detector each comprise a comparator circuit.

3. The circuit of claim 1, wherein the switch control comprises a programmable microcontroller.

4. The circuit of claim 1, wherein the switch comprises a solid state relay.

5. The circuit of claim 1, wherein the load insertion detector comprises a comparator circuit.

6. The circuit of claim 1, further comprising:
a reference voltage regulator adapted to couple to the electric power source and configured, upon being coupled thereto, to generate and supply a regulated voltage to the power switch, the load insertion detector, and the switch control.

7. An in-rush current limiter circuit, comprising:
a power switch adapted to couple to an electric power source, the power switch coupled to receive switch control signals and configured, in response thereto, to selectively transition between (i) an OFF state, in which electric current may not flow through the power switch, and (ii) an ON state, in which electric current may flow through the power switch;
a load insertion detector configured to supply an insertion signal and to sense when a load is electrically coupled to the electric power source, the load insertion detector configured, upon detecting that the load is electrically coupled to the electric power source, to transition the insertion signal from a HIGH state to a LOW state and then back to a HIGH state;
a load removal detector distinct from the load insertion detector and configured to supply a removal signal and to sense when the load is electrically decoupled from the electric power source, the load removal detector configured, upon detecting that the load is electrically decoupled, to transition the removal signal from a HIGH state to a LOW state; and
a switch control coupled to receive the insertion signal and the removal signal, the switch control configured to:
  (i) supply a first switch control signal for a predetermined time period upon the insertion signal transitioning from the HIGH state to the LOW state, the first switch control signal causing the power switch to transition to, or remain in, the OFF state for the predetermined time period,
  (ii) after the predetermined time period, supply a switch control signal that causes the power switch to transition to the ON state, and
  (iii) supply a switch control signal that causes the power switch to transition to the OFF state upon the removal signal transitioning from the HIGH state to the LOW state.

8. The circuit of claim 7, wherein the load insertion detector and the load removal detector each comprise a comparator circuit.

9. The circuit of claim 7, wherein the switch control comprises a programmable microcontroller.

10. The circuit of claim 7, wherein the switch comprises a solid state relay.

11. The circuit of claim 7, wherein the load insertion detector comprises a comparator circuit.

12. The circuit of claim 7, further comprising:
a reference voltage regulator adapted to couple to the electric power source and configured, upon being coupled thereto, to generate and supply a regulated voltage to the power switch, the load insertion detector, and the switch control.

* * * * *